(12) United States Patent
Aramaki et al.

(10) Patent No.: US 8,178,019 B2
(45) Date of Patent: May 15, 2012

(54) METHOD AND APPARATUS FOR PRODUCING CERAMIC HONEYCOMB STRUCTURE

(75) Inventors: Shuhei Aramaki, Miyako-gun (JP); Junji Komatsu, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 263 days.

(21) Appl. No.: 12/373,170

(22) PCT Filed: Sep. 27, 2007

(86) PCT No.: PCT/JP2007/068891
§ 371 (c)(1),
(2), (4) Date: Jan. 9, 2009

(87) PCT Pub. No.: WO2008/047565
PCT Pub. Date: Apr. 24, 2008

(65) Prior Publication Data
US 2009/0249579 A1   Oct. 8, 2009

(30) Foreign Application Priority Data
Sep. 28, 2006  (JP) .................................. 2006-265108

(51) Int. Cl.
*B28B 11/18* (2006.01)
*B08B 9/00* (2006.01)
*B08B 5/00* (2006.01)
(52) U.S. Cl. .......... 264/162; 15/405; 264/631; 425/289; 428/117
(58) Field of Classification Search .......... 264/161–162, 264/630–631; 428/116–117; 425/289; 15/405
See application file for complete search history.

(56) References Cited

U.S. PATENT DOCUMENTS

| | | | | |
|---|---|---|---|---|
| 4,629,409 A * | 12/1986 | Satoh et al. | .................... | 425/139 |
| 4,731,125 A * | 3/1988 | Carr | ................................... | 134/7 |
| 5,950,276 A * | 9/1999 | Everts et al. | .................... | 15/405 |
| 6,125,503 A * | 10/2000 | Callahan | ......................... | 15/414 |
| 6,158,082 A * | 12/2000 | Beckey et al. | .................. | 15/326 |
| 6,723,262 B2 * | 4/2004 | Hidaka et al. | ................ | 264/40.5 |
| 6,840,976 B2 * | 1/2005 | Vance et al. | .................... | 55/523 |
| 7,368,076 B2 * | 5/2008 | Miyakawa et al. | ........... | 264/628 |
| 7,427,309 B2 * | 9/2008 | Ohno et al. | ..................... | 55/523 |
| 7,569,201 B2 * | 8/2009 | Otsuka et al. | ................. | 423/345 |
| 7,575,792 B2 * | 8/2009 | Fukuda et al. | ................ | 428/116 |
| 7,845,048 B1 * | 12/2010 | Bailey et al. | ..................... | 15/405 |
| 2002/0093123 A1 * | 7/2002 | Miura et al. | .................. | 264/432 |

(Continued)

FOREIGN PATENT DOCUMENTS

EP   0 372 606 A   6/1990

(Continued)

OTHER PUBLICATIONS

Communication from European Patent Office dated May 26, 2011, issued in Application No. 07828637.4.

(Continued)

*Primary Examiner* — Joseph Del Sole
*Assistant Examiner* — Nahida Sultana
(74) *Attorney, Agent, or Firm* — Sughrue Mion, PLLC (57) ABSTRACT

A method for producing a ceramic honeycomb structure comprising the steps of machining end surfaces of an unsintered or sintered ceramic honeycomb structure, and ejecting a gas from a slit-like orifice moving relative to an opposing end surface without contact, thereby removing dust and/or cut pieces from end surface portions.

18 Claims, 6 Drawing Sheets

U.S. PATENT DOCUMENTS

| | | | |
|---|---|---|---|
| 2002/0104186 A1* | 8/2002 | Miyamoto | 15/414 |
| 2005/0251954 A1* | 11/2005 | Guest et al. | 15/405 |
| 2005/0255288 A1* | 11/2005 | Noguchi et al. | 428/116 |
| 2008/0006971 A1* | 1/2008 | Kawai et al. | 264/630 |

FOREIGN PATENT DOCUMENTS

| | | | |
|---|---|---|---|
| EP | 1 825 979 A1 | | 8/2007 |
| JP | 08-117713 | * | 5/1996 |
| JP | 08-117713 A | | 5/1996 |
| JP | 2000-043024 | * | 2/2000 |
| JP | 2000-043024 A | | 2/2000 |
| JP | 2003-181819 A | | 7/2003 |
| JP | 2007-230859 A | | 9/2007 |
| JP | 2007-237558 A | | 9/2007 |

OTHER PUBLICATIONS

Chinese Office Action issued in Application No. 200780025643.X dated Mar. 2, 2011.

* cited by examiner

METHOD AND APPARATUS FOR PRODUCING CERAMIC HONEYCOMB STRUCTURE

CROSS REFERENCE TO RELATED APPLICATIONS

This application is a National Stage of International Application No. PCT/JP2007/068891 filed Sep. 27, 2007, claiming priority based on Japanese Patent Application No. 2006-265108, filed Sep. 28, 2006, the contents of which are incorporated herein by reference in their entirety.

FIELD OF THE INVENTION

The present invention relates to a method and apparatus for producing a ceramic honeycomb structure, particularly to a method and apparatus for producing a ceramic honeycomb structure by removing dust and cut pieces generated by cutting or grinding the ceramic honeycomb structure to a predetermined size from end surfaces and cell walls thereof.

BACKGROUND OF THE INVENTION

Figure 3A:
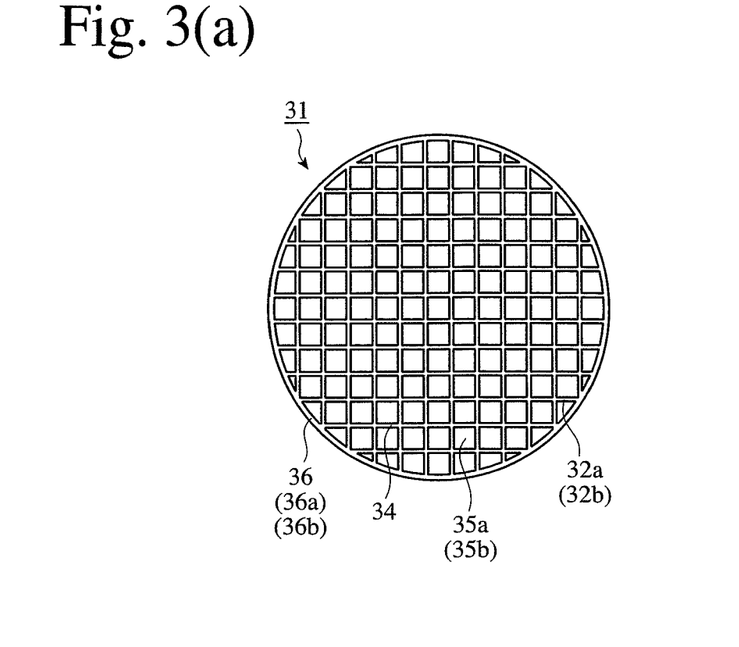
FIG. 3(a) is a front view showing one example of the honeycomb structures.
Figure 3B:
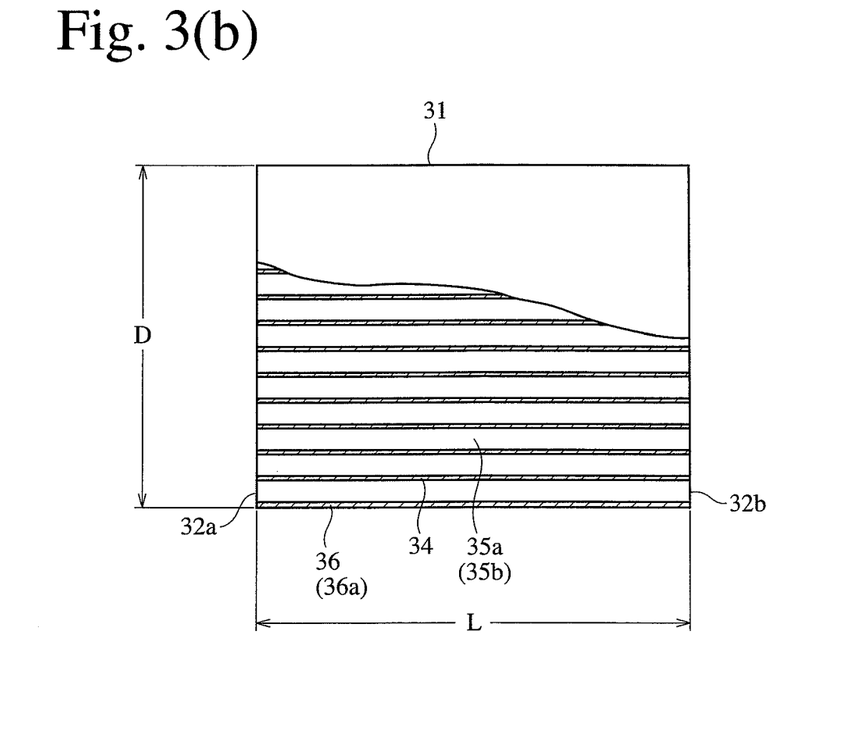
FIG. 3(b) is a partial cross-sectional view showing one example of the honeycomb structures.
Figure 3C:
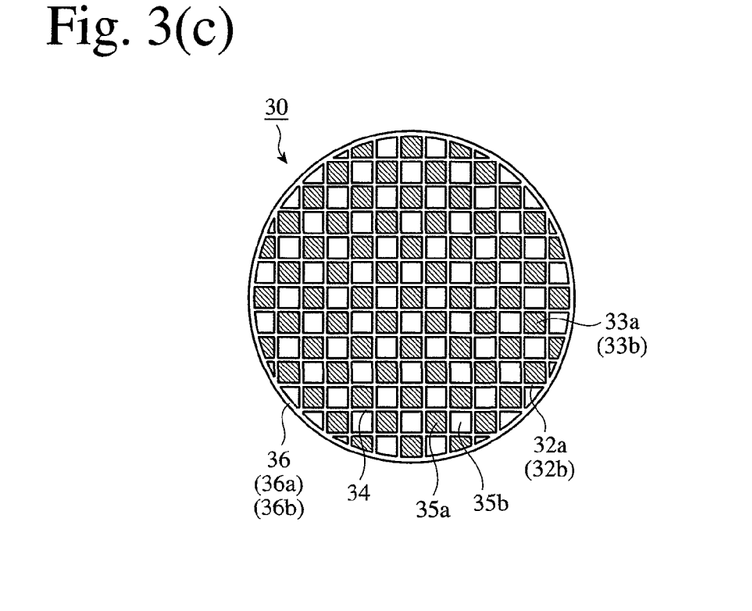
FIG. 3(c) is a front view showing one example of the ceramic honeycomb filters.
Figure 3D:
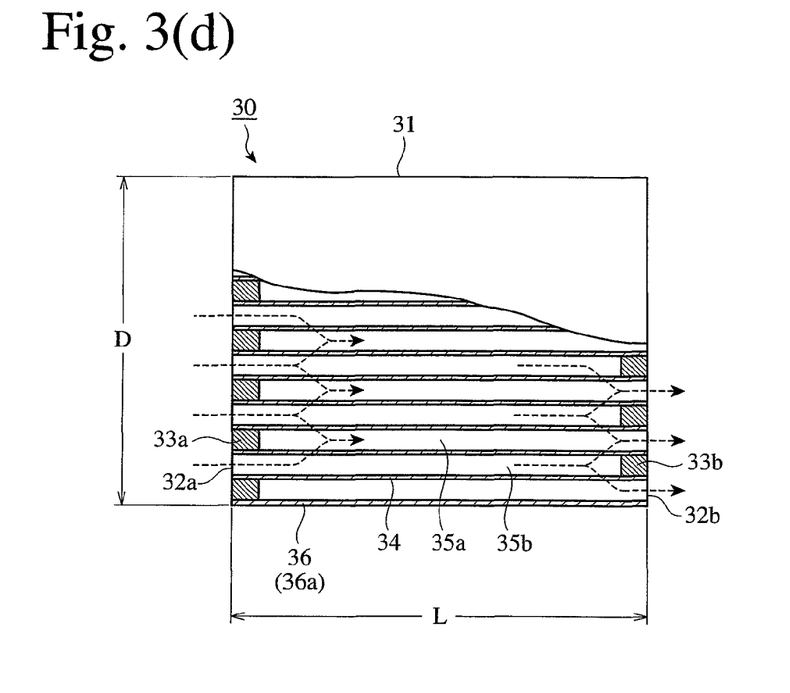
FIG. 3(d) is a partial cross-sectional view showing one example of the ceramic honeycomb filters.

For the purpose of regional and global environment protection, ceramic honeycomb structures are used in exhaust-gas-cleaning catalyst converters to reduce harmful materials contained in exhaust gases from automobile engines, etc. To capture fine graphite particles, etc. contained in exhaust gas from diesel engines, exhaust-gas-cleaning filters comprising porous ceramic honeycomb structures with both cell ends alternately plugged are recently used. As shown in FIGS. 3(a) and 3(b), a ceramic honeycomb structure 31 comprises a peripheral wall 36, and cell walls 34 perpendicularly crossing each other inside the peripheral wall 36 for defining large numbers of cells 35. As shown in FIGS. 3(c) and 3(d), a ceramic honeycomb filter 30 for cleaning an exhaust gas from automobiles by capturing particulate matter comprises a ceramic honeycomb structure 31 whose both end surfaces 32a, 32b are alternately sealed by plugs 33a, 33b in a checkerboard pattern.

The ceramic honeycomb structure 31 is produced by the steps of (1) preparing a moldable material by weighing, mixing and blending materials such as a ceramic powder, a binder, etc., (2) extruding the moldable material through a honeycomb die, (3) cutting the extruded moldable material to form a honeycomb-structure, molded body (simply called "molded body"), (4) drying and sintering the molded body, (5) machining end surfaces 32a, 32b of the dried or sintered molded body with a tool such as a diamond cutter, a diamond saw, etc. to form a ceramic honeycomb structure 31 having a predetermined length L, (6) sealing cells 35a, 35b at both end surfaces 32a, 32b of the ceramic honeycomb structure 31 shown in FIG. 3(a) with plugs 33a, 33b, and (7) sintering the plugs to form a ceramic honeycomb filter 30 shown in FIG. 3(c). The sealing step (6) may be conducted after drying the molded body or after sintering the dried body.

Figure 4:
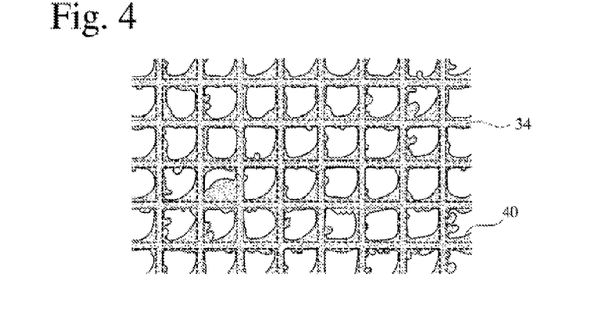
FIG. 4 is a front view showing dust and cut pieces attached to an end surface of a machined honeycomb structure.

In the step (5) of forming the ceramic honeycomb structure 31, as shown in FIG. 4, when the end surfaces 32a, 32b are machined by a tool, dust and cut pieces 40 are attached to the end surfaces 32a, 32b and cell walls 34 near the end surfaces 32a, 32b. Dust and cut pieces attached to the end surfaces 32a, 32b and the cells 35a, 35b have been removed by a vacuum cleaner, etc. manually and carefully. Such manual method, however, fails to remove dust and cut pieces attached to the cells deep from the end surfaces. Further, because the ceramic honeycomb structure has relatively low impact strength, its cell walls on the end surfaces are damaged and broken during removing dust and cut pieces. Accordingly, carefulness is needed to avoid damaging the cell walls, and a manual method is extremely inefficient particularly for large ceramic honeycomb structures 31 of 20 cm or more in diameter.

When dust remains in the cells of the dried ceramic honeycomb structure, the dust is adhered to the cell walls in a subsequent sintering step, providing the honeycomb structure with large pressure loss. When dust remains in the cells of the sintered ceramic honeycomb structure, a catalyst cannot be effectively carried in a subsequent catalyst-carrying step. Also, when used as a ceramic honeycomb filter, the dust is adhered to the cell walls in a plug-sintering step, providing the ceramic honeycomb filter with large pressure loss.

The damaging and breakage of the cell walls 34 on the end surfaces 32a, 32b provide the ceramic honeycomb structure with low strength and reliability. When used as a ceramic honeycomb filter, a plugging material charged into the cells flows into adjacent cells through the broken cell walls, resulting in large pressure loss.

Figure 5A:
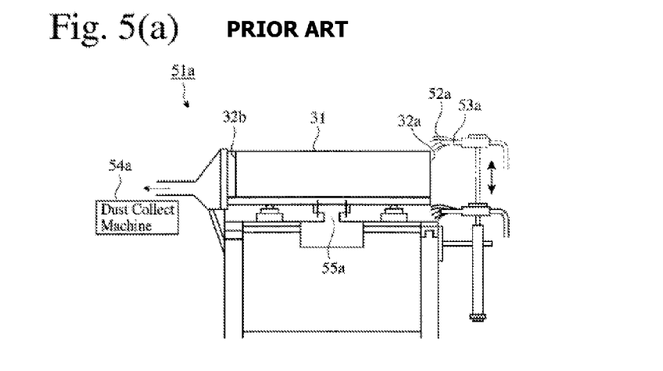
FIG. 5(a) is a side view showing the apparatus of JP 8-117713 A for cleaning an end surface portion of a ceramic honeycomb structure.
Figure 5B:
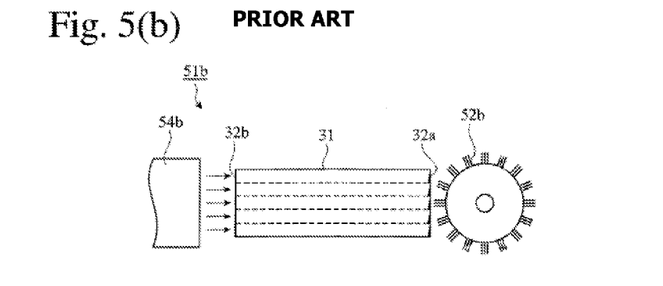
FIG. 5(b) is a side view showing the machining apparatus of JP 2000-43024 A.

As a method for mechanically removing dust and cut pieces from end surface portions of the ceramic honeycomb structure, JP 8-117713 A discloses an apparatus 51a for cleaning end surface portions of a honeycomb structure as shown in FIG. 5(a). The apparatus 51a comprises a spray nozzle 53a with a brush 52a, which is opposing an end surface 32a of the ceramic honeycomb structure 31, and vertically movable in parallel with the end surface 32a, a narrow dust-collecting hopper 54a disposed at an end surface 32b on the opposite side of the end surface 32a, a carrier 55a for rotating 180° a table on which the ceramic honeycomb structure is placed, and a mechanism for moving the spray nozzle 53a with the brush 52a vertically, such that dust and cut pieces are detached from the end surface 32a by the brush 52a and blown off by air ejected from the spray nozzle 53a. In FIG. 5(a) and FIG. 5(b) mentioned later, the same reference numerals are assigned to substantially the same members as in FIG. 3. JP 8-117713 A describes that dust and cut pieces can be easily removed from the end surface 32a (and 32b) of the ceramic honeycomb structure by the cleaning apparatus 51a, and collected without scattering by the dust-collecting hopper 54a directly connected to a dust-collecting machine 54, thereby preventing the deterioration of working environment.

JP 2000-43024 A discloses, as shown in FIG. 5(b), a machining apparatus 51b for removing fine powder and burr generated by cutting from a end surface portion, by blowing air onto cells on an end surface 32b of a honeycomb structure 31, while brushing an end surface 32a with a brush 52b. JP 2000-43024 A describes that the machining apparatus 51b can completely remove burr, etc. from the end surface 32a of the honeycomb structure 31 without damaging the end surface 32a.

However, the methods described in JP 8-117713 A and JP 2000-43024 A conduct brushing while blowing air onto the end surfaces 32a, 32b of the honeycomb structure, likely damaging the cell walls 34. Particularly, ceramic honeycomb structures as shown in FIG. 3(a) recently used for exhaust-gas-cleaning catalyst converters comprise cell walls as thin as 0.15 mm or less to have small heat capacity to accelerate the activation of a catalyst even at the time of cold start, and ceramic honeycomb structures 31 used for the ceramic honeycomb filters 30 as shown in FIG. 3(c) comprise cell walls 34 having as high porosity as 50-80%. Because the ceramic honeycomb structures having such low heat capacity or high porosity comprise extremely-low-strength cell walls 34, the brushing of the end surfaces 32a, 32b as in the above methods described in JP 8-117713 A and JP 2000-43024 A are likely to damage cell walls 34 on the end surfaces 32a, 32b.

Attempts to remove dust and cut pieces only with air blow without using a brush to prevent cell walls near the end surfaces from being damaged by brushing fail to achieve efficient removal of the dust and cut pieces, resulting in poor quality with dust and cut pieces remained, and take a long period of time for removal, resulting in high cost.

OBJECT OF THE INVENTION

Accordingly, an object of the present invention is to provide a method and an apparatus for producing a ceramic honeycomb structure, which are capable of efficiently removing dust and cut pieces generated by cutting or grinding end surfaces of a dried or sintered ceramic honeycomb structure from end surfaces and cells near the end surfaces without damaging the end surfaces.

DISCLOSURE OF THE INVENTION

Thus, the method of the present invention for producing a ceramic honeycomb structure comprises the steps of machining end surfaces of an unsintered or sintered ceramic honeycomb structure, and ejecting a gas from a slit-like orifice moving relative to an opposing end surface without contact, thereby removing dust and/or cut pieces from an end surface portion.

The slit-like orifice preferably has a slit width of 0.5-5 times the cell pitch of the ceramic honeycomb structure.

Compressed air at pressure P of 0.2-0.5 MPa is preferably ejected from the orifice for cleaning.

A gap A between the orifice and the end surface is preferably 5-100 mm. The gap A is preferably 1-35% of the length L of the ceramic honeycomb structure.

The gap A between the orifice and the end surface is preferably changed to conduct the cleaning step 2 or more times. The gap A is preferably gradually reduced to repeat the cleaning step.

The cleaning step is preferably conducted 2 times. The gap A is 50-100 mm in the first cleaning step and 5-50 mm in the second cleaning step.

To conduct cleaning, a gas is preferably ejected onto one end surface of the ceramic honeycomb structure, and then onto the other end surface thereof.

Dust attached to end surface portions preferably has the maximum diameter of 1.2 mm or less.

Cleaning is preferably conducted while the gas is sucked by a hood opposing an end surface on the opposite side of the end surface under cleaning.

The flow rate Q1 (m$^3$/s) of a gas ejected from a slit-like orifice onto the end surface under cleaning, and the flow rate Q2 (m$^3$/s) of a gas sucked by a hood opposing the opposite end surface preferably meet the relation of Q1<Q2.

After conducting the cleaning, dust remaining in the cells of the ceramic honeycomb structure is preferably inspected.

The amount of water in the unsintered ceramic honeycomb structure is preferably 0.1-2%.

Masking members are preferably disposed on an outer peripheral surface of the ceramic honeycomb structure.

The gas ejected from the orifice preferably has a dew point of 10° C. or lower.

The ceramic honeycomb structure is preferably cleaned in a substantially horizontal state.

The sintered ceramic honeycomb structure preferably has a porosity of 50-80%.

The apparatus of the present invention for producing a ceramic honeycomb structure by cleaning end surface portions of the ceramic honeycomb structure with a gas ejected from an opposing slit-like orifice, comprises a fixing means for gripping an outer peripheral surface of the ceramic honeycomb structure with both end surfaces of the ceramic honeycomb structure kept open, a slit-like orifice opposing one end surface of the ceramic honeycomb structure with a predetermined gap A, a means for supplying a gas to the orifice, and a means for moving the orifice relative to an end surface of the ceramic honeycomb structure without contact.

The production apparatus preferably has a mechanism for setting a gap A between the orifice and the end surface to 5-100 mm. The production apparatus preferably has a mechanism for ejecting compressed air at pressure P of 0.2-0.5 MPa from the orifice.

In the production apparatus, the orifice preferably has a slit width of 0.5-5 times the cell pitch of the ceramic honeycomb structure. The orifice preferably has a slit length of 0.2-0.5 times the outer diameter of the ceramic honeycomb structure.

In the production apparatus, the gap A between the orifice and the end surface is preferably set at plural levels.

The production apparatus preferably has a mechanism for rotating the honeycomb structure by 180° to clean one end surface portion of the honeycomb structure and then the other end surface portion thereof.

The production apparatus preferably comprises a member for masking an outer peripheral surface of the honeycomb structure.

The production apparatus preferably ejects a gas having a dew point of 10° C. or lower from the orifice.

The production apparatus preferably comprises a hood opposing an end surface on the opposite side of the end surface under cleaning.

DESCRIPTION OF THE BEST MODE OF THE INVENTION

[1] Production Method

In the method of the present invention for producing a ceramic honeycomb structure, with a predetermined gap A between a slit-like orifice and an end surface of the ceramic honeycomb structure, a gas is ejected from the orifice without contact. The gas ejected from the orifice entrains an ambient air to increase its flow rate, thereby increasing the flow rate of the gas flowing through the cells of the ceramic honeycomb structure from the end surface. Accordingly, dust and/or cut pieces attached to the end surfaces and the cell walls can be surely removed without damaging the end surfaces of the ceramic honeycomb structure. By moving the orifice relative to the end surface, the gas can enter the entire end surface.

Particularly, a narrower cell pitch of the ceramic honeycomb structure makes it more difficult for the gas ejected from the orifice to enter the cells of the ceramic honeycomb structure through the end surface, and to blow off dust and cut pieces on the end surfaces and in the cells. However, the method of the present invention can surely remove dust and cut pieces from the end surfaces and the entire length of cells of the ceramic honeycomb structure.

In the case of a sintered ceramic honeycomb structure having cell walls with pores, a gas ejected from the orifice and entering the cells of the ceramic honeycomb structure through the end surface, passes through pores in the cell walls to enter the adjacent cells, so that dust and cut pieces in the cells are not easily blown off. This tendency is remarkable particularly when the cell walls have as high porosity as 50-80%. However, the method of the present invention can surely remove dust and cut pieces from the end surfaces and the entire length of cells of the ceramic honeycomb structure.

Further, with dust attached to both end surfaces of the machined ceramic honeycomb structure, a gas is ejected from an orifice opposing one end surface of the ceramic honeycomb structure. As a result, dust attached to one end surface portion passes through the cells, and impinges dust attached to the other end surface portion to efficiently remove it.

A gas ejected from the slit-like orifice can surely enter the cells of the ceramic honeycomb structure through an end surface, thereby efficiently removing dust and cut pieces on the end surfaces and in the cells.

To surely remove dust and cut pieces from the end surfaces and the cells, the slit-like orifice preferably has a slit width of 0.5-5 times the cell pitch of the ceramic honeycomb structure, and a slit length of 0.2-0.5 times the outer diameter of the ceramic honeycomb structure. When the slit width is less than 0.5 times the cell pitch of the ceramic honeycomb structure, or when the slit length is less than 0.2 times the outer diameter of the ceramic honeycomb structure, a gas-ejected region is too narrow to the end surface of the ceramic honeycomb structure, needing a lot of steps and time to clean the entire end surface portion. On the other hand, when the slit width is more than 5 times the cell pitch of the honeycomb structure, or when the slit length is more than 0.5 times the outer diameter of the honeycomb structure, a gas ejected from the orifice does not have enough effect of entraining an ambient air to increase the flow rate of the gas. More preferably, the slit width is 0.8-3 times the cell pitch of the honeycomb structure, and slit length is 0.25-0.45 times the outer diameter of the honeycomb structure.

In order that a gas ejected from the orifice entrains an ambient air to increase its flow rate, thereby increasing the flow rate of the gas entering the cells of the ceramic honeycomb structure through the end surface to surely remove dust and cut pieces from the end surfaces and the cells, the gap A between the orifice and the end surface of the ceramic honeycomb structure is preferably 5-100 mm, and the pressure P of a compressed air ejected from the orifice is preferably 0.2-0.5 MPa. When the gap A is less than 5 mm, the gas ejected from the orifice substantially does not entrain an ambient atmosphere, so that the flow rate of the gas does not increase, failing to completely remove dust and cut pieces from the end surfaces and the cells. On the other hand, when the gap A is more than 100 mm, the flow rate of the gas ejected from the orifice becomes too low until the gas reaches the end surface of the ceramic honeycomb structure, failing to completely remove dust and cut pieces from the end surfaces and the cells. When the gas pressure is less than 0.2 MPa, the gas ejected from the orifice has too low a flow rate to completely remove dust and cut pieces from the end surfaces and cells of the ceramic honeycomb structure. When the gas pressure is more than 0.5 MPa, the gas pressure is too high, damaging the cell walls.

In order that the gas ejected from the orifice entrains an ambient air to increase its flow rate, thereby surely removing dust and cut pieces from the end surfaces and the cells, the gap A between the orifice and the end surface of the ceramic honeycomb structure is preferably 1-35% of the length L of the ceramic honeycomb structure, and the pressure P of the compressed air ejected from the orifice is preferably 0.2-0.5 MPa. When the gap A is less than 1% of the length L of the ceramic honeycomb structure, the gas ejected from the orifice substantially does not entrain an ambient atmosphere, failing to increase its flow rate, so that dust and cut pieces are not sufficiently removed from the end surfaces and the cells. When the gap A is more than 35% of the length L of the ceramic honeycomb structure, the flow rate of the gas ejected from the orifice become too low until the gas reaches the end surface of the ceramic honeycomb structure, failing to completely remove dust and cut pieces from the end surfaces and the cells. When the gas pressure is less than 0.2 MPa, the gas ejected from the orifice has too low a flow rate to completely remove dust and cut pieces from the end surfaces and cells of the ceramic honeycomb structure. When the gas pressure is more than 0.5 MPa, the gas pressure is too high, making it likely that the cell walls are damaged.

With the gap A between the orifice and the end surface changed, the end surface portion is preferably cleaned plural times to completely remove dust and cut pieces from the end surfaces and cells of the ceramic honeycomb structure. As described above, with a predetermined gap A between the orifice and an end surface of the ceramic honeycomb structure, the gas ejected from the orifice entrains an ambient air to increase the flow rate of the gas, and the size of the gap A changes the flow rate of a gas entering the cells of the ceramic honeycomb structure through the end surface. Accordingly, the variation of the gap A can change the flow rate of a gas entering the cells of the ceramic honeycomb structure through the end surface. To remove mainly dust and cut pieces attached to an end surface of the ceramic honeycomb structure, the gap A is set relatively large to reduce the flow rate of a gas entering the cells. On the other hand, to remove dust and cut pieces attached to the cells predominantly, the gap A is set relatively small to increase the flow rate of the gas entering the cells. By conducting cleaning plural times with the gap A changed, dust and cut pieces can be more efficiently removed from the end surfaces and the cells.

It is preferable to conduct cleaning plural times with the gap A gradually reduced. Namely, a gap A1 set in the first cleaning step, a gap A2 set in the second cleaning step, a gap A3 set in the third cleaning step, . . . and a gap An set in the n-th cleaning step preferably meet the relation of A1>A2>A3> . . . >An. Particularly, taking into consideration the production efficiency, it is preferable to conduct cleaning two times with the gap A changed. In this case, a gap A1 in the first cleaning step is preferably larger than a gap A2 in the second cleaning step (A1>A2). With the gap A set relatively large in the first cleaning step, the flow rate of a gas reaching the end surface is increased, thereby conducting rough cleaning for removing dust and cut pieces from the end surface portions. And with the gap A set relatively small in the second cleaning step, the flow rate of a gas entering the cells is increased, thereby removing dust and cut pieces attached to the cells predominantly. Such plural cleaning steps with the gap A changed can remove dust and cut pieces from the end surfaces and the cells more efficiently as finish cleaning. Three or more cleaning steps can also be conducted by repeating cleaning steps with the gap A gradually reduced, thereby removing dust and cut pieces more efficiently.

The gap between the orifice and the end surface is preferably 50-100 mm in the first cleaning step, and 5-50 mm in the second gap. When the first gap is less than 50 mm, the gas ejected from the orifice has a small effect of entraining an ambient air to increase the flow rate of the gas, so that dust and cut pieces on the end surface are less blown off. On the other hand, when the first gap is more than 100 mm, the flow rate of a gas ejected from the orifice becomes too low before the gas reaches the end surface of the ceramic honeycomb structure, dust and cut pieces on the end surface cannot sufficiently be removed. When the second gap is less than 5 mm, the gas ejected from the orifice does not entrain an ambient air, so that the flow rate of the gas does not increase. As a result, the flow rate of the gas entering the cells of the ceramic honeycomb structure through the end surface does not increase, failing to efficiently remove dust and cut pieces from the end surfaces and the cells. On the other hand, when the second gap is more than 50 mm, fine dust and cut pieces remaining on the end surfaces and in the cells are not completely removed, failing to achieve finish cleaning.

After ejecting a gas onto one end surface of the ceramic honeycomb structure for cleaning, the gas is preferably ejected onto the other end surface for further cleaning. Even though dust and cut pieces attached to one end surface portion flow into the cells and remain therein when the one end surface portion is cleaned, the subsequent cleaning by ejecting a gas onto the other end surface can surely blow off dust remaining in the cells.

A step of inspecting dust remaining in the ceramic honeycomb structure is preferably conducted to confirm that dust has been surely removed from the cells. The inspection of dust remaining in the ceramic honeycomb structure can be conducted by a method described, for instance, in JP 2005-274179 A, which is a light transmission inspection method of observing light entering the ceramic honeycomb structure through one end and exiting from the other end. Although light transmitting through the ceramic honeycomb structure can be observed directly with the naked eye, it is preferable to take a camera view of the transmitting light, in which the clogging of cells, etc. are observed. In the camera view, the number of cells, through which light does not pass, is counted to determine its ratio to the total number of cells, with which the remaining dust is evaluated. When it is confirmed by this inspection that dust remains in the ceramic honeycomb structure, the cleaning is preferably conducted again, and if necessary, the inspection of dust remaining in the ceramic honeycomb structure is conducted again.

The amount of water in the ceramic honeycomb structure is preferably 0.1% or more. With 0.1% or more of water, dust generated by machining one end surface of the ceramic honeycomb structure easily passes through the cells and is removed from the other end of the ceramic honeycomb structure. When the amount of water is less than 0.1%, cracking easily occurs when an end surface of the ceramic honeycomb structure is machined. When the amount of water exceeds 1.5%, large dust is generated, likely clogging the cells without passing therethrough toward outside. The amount of water in the ceramic honeycomb structure is more preferably 0.3-1.1%.

When a gas is ejected from a slit orifice opposing one end surface for cleaning, a hood for sucking the gas is preferably disposed in opposition to the other end surface. The flow rate $Q1$ ($m^3/s$) of a gas ejected from the slit orifice and the flow rate $Q2$ ($m^3/s$) of the gas at the hood preferably meet the relation of $Q1<Q2$. With the flow rates $Q1$ and $Q2$ meeting the relation of $Q1<Q2$, there is a large effect of causing dust attached to one end surface portion to pass through the cells and impinge dust attached to the other end surface portion, thereby more efficiently removing dust from the other end surface portion. The relation of $Q2/Q1 \geq 1.1$ is more preferable, and the relation of $Q2/Q1 \geq 1.3$ is further preferable.

The maximum diameter of dust attached to the end surface portion is preferably 1.2 mm or less. Dust attached to an end surface portion of the ceramic honeycomb structure by its machining passes through the cells of the ceramic honeycomb structure from one end surface to the other end surface and exits from the cells by the cleaning of the present invention. When the maximum diameter of dust is larger than the inner diameter of each cell, dust does not pass through and exit from the cells. When the maximum diameter of dust is substantially the same as the inner diameter of each cell, dust is likely to stop in the cells, so that it does not exit from the cells. When the maximum diameter of dust is 1.2 mm or less, dust passes through the cells of the ceramic honeycomb structure from one end surface to the other end surface and exits from the cells, though depending on the cells size. To provide dust with the maximum diameter of 1.2 mm or less, a grinder used for machining preferably has a particle size of #200 or #400. The maximum diameter of dust is preferably 0.05 mm or more. Dust having a diameter of 0.05 mm or more passes through the cells and impinges dust attached to the other end surface portion, thereby expelling the dust attached to the other end surface portion from the cells.

Masking members are preferably fixed to a peripheral wall of the ceramic honeycomb structure. Because the peripheral wall 36a of the sintered ceramic honeycomb structure has pores, air escapes from cells 35a, 35b immediately inside the peripheral wall 36a through its pores, resulting in a reduced blowing force. In a ceramic honeycomb structure obtained by removing a peripheral wall and its adjacent cells from an extrusion-molded ceramic honeycomb structure by machining to avoid the destruction and deformation of cells near the peripheral wall, and then sintered, air escapes through the pores of cells in a periphery portion 36b, resulting in a reduced blowing force. Accordingly, masking members disposed around the outer peripheral surface 36 of the ceramic honeycomb structure prevent a blowing force from decreasing by stopping air from escaping through the pores of the peripheral wall 36a or cells in the periphery portion 36b, so that dust and cut pieces can be effectively removed even from cells near the peripheral wall. To prevent the blowing force from decreasing, preferably 60% or more, more preferably 80% or more, of the outer peripheral surface 36 of the ceramic honeycomb structure is covered with the masking members. Also, to prevent the ceramic honeycomb structure from being broken and damaged when it comes into contact with the masking members, each masking member is preferably provided with a cushion in a portion coming into contact with the ceramic honeycomb structure. Cushion materials may be sponges, polyurethanes, rubbers, etc.

The gas ejected from the orifice preferably has a dew point of 10° C. or lower. When the gas entering the cells through the end surface contains a large amount of water, water contained in the gas makes dust and cut pieces easily attach to the cells, so that dust and cut pieces remain on the end surfaces and in the cells. Using a gas having a dew point of 10° C. or lower, dust and cut pieces can be surely removed from the end surfaces and the cells. The gas preferably has a water content of 0.6% or less (absolute humidity).

The ceramic honeycomb structure is cleaned preferably in a substantially horizontal state. To keep the ceramic honeycomb structure substantially horizontally, the outer peripheral surface of the honeycomb structure is gripped, so that a gas can be ejected to the entire end surface. To clean the honeycomb structure in a substantially vertical state, the honeycomb structure should be supported at one end. When the honeycomb structure is placed on a support, an end surface thereof may be damaged and broken.

After an end surface portion of the ceramic honeycomb structure is cleaned, the amount of dust and cut pieces remaining on the end surfaces and in the cells of the ceramic honeycomb structure is preferably 10 g or less. With dust and cut pieces limited to 10 g or less, they are not adhered to cell walls in the sintering step, thereby preventing the pressure loss of the honeycomb structure from increasing, and making it possible to effectively carry a catalyst. When used as a ceramic honeycomb filter, dust is prevented from adhering to cell walls in the step of sintering a plugging material, thereby avoiding pressure loss increase in the ceramic honeycomb filter. The amount of the remaining dust and cut pieces is preferably 5 g or less.

The production method of the present invention can efficiently remove dust and cut pieces from the cells without damaging the end surfaces of the dried or sintered ceramic honeycomb structure, and it is largely effective on easily damageable cell walls at the end surfaces, particularly when the cell walls of the ceramic honeycomb structure are as thin as 0.15 mm or less or as large as 50-80% in porosity.

[2] Production Apparatus

The apparatus of the present invention for producing a ceramic honeycomb structure ejects a gas from a slit-like orifice opposing an end surface of the ceramic honeycomb structure to clean the end surface portion, comprising a fixing means for gripping an outer peripheral surface of the ceramic honeycomb structure with both end surfaces thereof kept open, a slit-like orifice opposing one end surface of the ceramic honeycomb structure with a predetermined gap A, a means for supplying a gas to the orifice, and a means for moving the orifice relative to an end surface of the ceramic honeycomb structure without contact. A gas ejected from the slit-like orifice can surely enter the cells of the honeycomb structure through the end surface, to remove dust and cut pieces from the end surfaces and the cells. With a predetermined distance A between the orifice and an end surface of the ceramic honeycomb structure, the gas ejected from the orifice entrains an ambient air to increase the flow rate of the gas, thereby increasing the flow rate of the gas entering the cells through the end surface. As a result, dust and cut pieces can be removed from the end surfaces and the cells without damaging the end surfaces. By moving the orifice relative to the end surface, a gas can enter the entire end surface.

To keep enough pressure to remove dust and cut pieces from the end surfaces and the cells, the orifice preferably has a slit width of 0.5-5 times the cell pitch of the honeycomb structure, and a slit length of 0.2-0.5 times the outer diameter of the honeycomb structure. When the slit width is less than 0.5 times the cell pitch of the ceramic honeycomb structure, or when the slit length is less than 0.2 times the outer diameter of the ceramic honeycomb structure, a gas-ejecting region is too narrow relative to the end surface of the ceramic honeycomb structure, needing a lot of steps and time to clean the entire end surface portion. When the slit width exceeds 5 times the cell pitch of the honeycomb structure, or when the slit length exceeds 0.5 times the outer diameter of the honeycomb structure, the gas ejected from the orifice has a small effect of entraining an ambient air to increase the flow rate of the gas. More preferably, the slit width is 0.8-3 times the cell pitch of the honeycomb structure, and slit length is 0.25-0.45 times the outer diameter of the honeycomb structure.

[3] Ceramic Honeycomb Structure

The ceramic honeycomb structure in the method and apparatus of the present invention may be made of any material, which is preferably one or more of cordierite, alumina, mullite, silicon nitride, sialon, silicon carbide, aluminum titanate, aluminum nitride and LAS. Among them, a ceramic honeycomb structure comprising cordierite as a main crystal has a porosity of 50-80% and thus small strength, and the method and apparatus of the present invention are particularly effective thereto.

[4] Embodiments

The embodiments of the present invention will be explained in detail referring to the drawings.

Figure 1A:
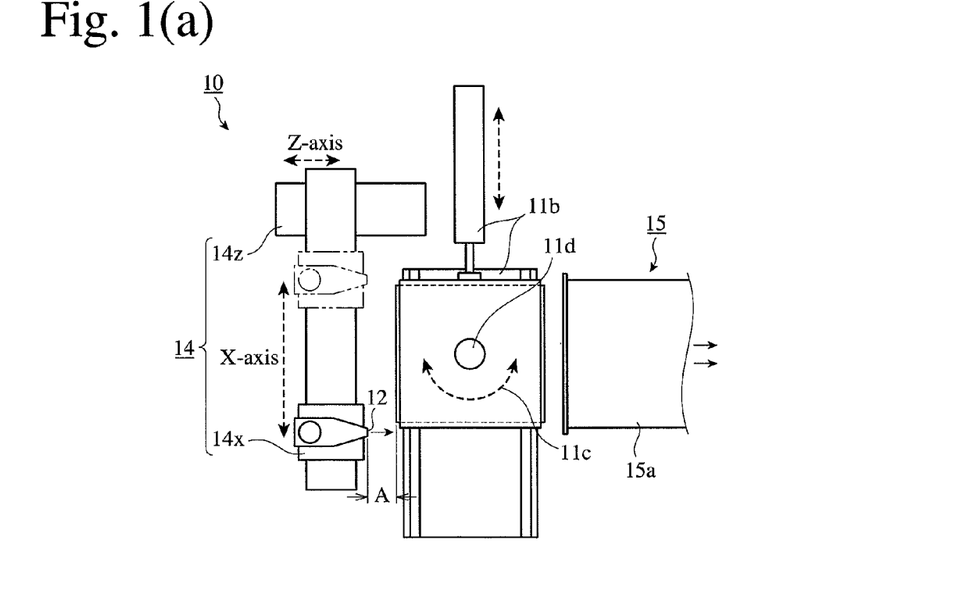
FIG. 1(a) is a schematic plan view showing an apparatus for cleaning an end surface portion of a ceramic honeycomb structure.
Figure 1B:
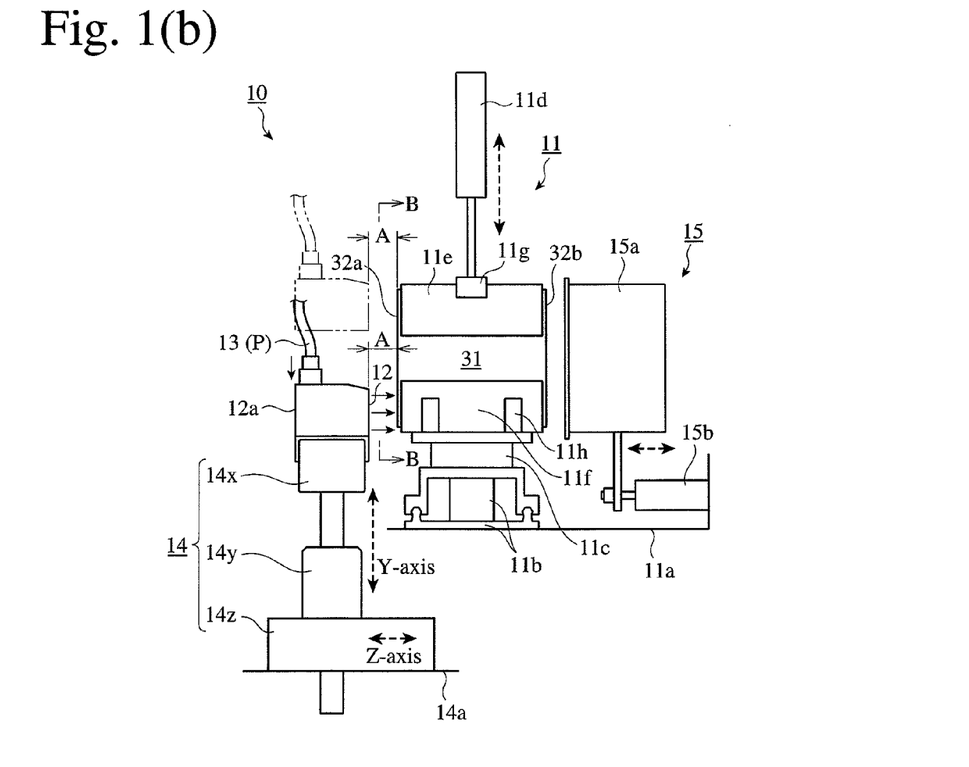
FIG. 1(b) is a schematic front view showing an apparatus for cleaning an end surface portion of a ceramic honeycomb structure.
Figure 1C:
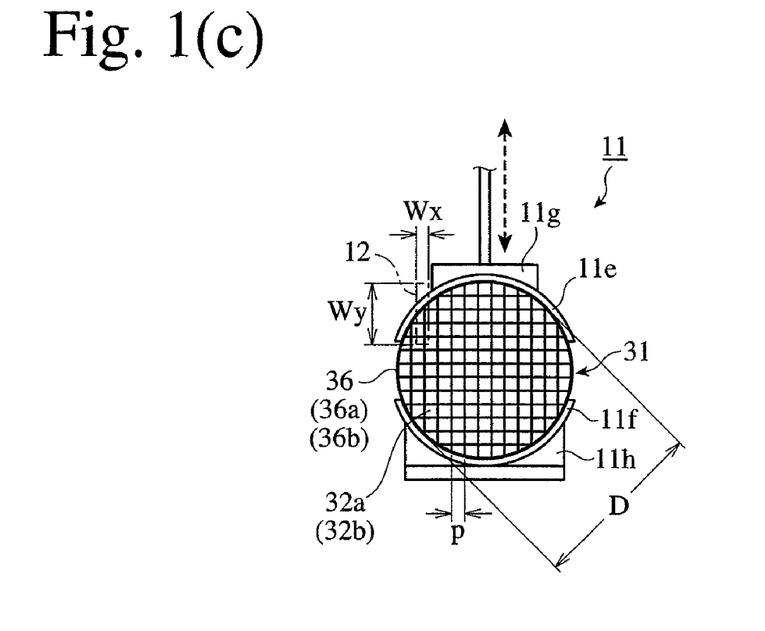
FIG. 1(c) is a cross-sectional view taken along the line B-B in FIG. 1(b).

FIGS. 1(a) to 1(c) show the production apparatus (simply "apparatus") 10 of the present invention for cleaning the end surface portions of the honeycomb structure. The apparatus 10 comprises a fixing means 11 for gripping an outer peripheral surface 36 with both end surfaces 32a, 32b of the ceramic honeycomb structure 31 kept open, a slit-like orifice 12 opposing an end surface 32a of the gripped ceramic honeycomb structure 31 with a predetermined gap A, a means 13 for supplying compressed air P to this orifice 12, a means 14 for moving the orifice 12 relative to the end surface 32a of the ceramic honeycomb structure 31, and a dust-collecting means 15 disposed on the opposite side of the orifice 12. The orifice 12 is moved by the means 14 relative to the end surface 32a while ejecting a gas.

The fixing means 11, which is disposed on a base 11a of the apparatus 10, comprises a slide 11b for retreating the ceramic honeycomb structure 31 to the original position at the time of attaching or detaching the ceramic honeycomb structure 31 and advancing the ceramic honeycomb structure 31 in a cleaning step, a rotary actuator 11c mounted onto the slide 11b for turning the ceramic honeycomb structure 31 such that both end surfaces 32a, 32b can be cleaned, and a pneumatic cylinder 11d disposed above the rotary actuator 11c for gripping the outer peripheral surface 36 with both end surfaces 32a, 32b of the ceramic honeycomb structure 31 kept open. The peripheral surface 36 of the ceramic honeycomb structure 31 is gripped by upper and lower clamps 11g, 11h; two clamps 11h positioned below the ceramic honeycomb structure 31, and a clamp 11g positioned above the ceramic honeycomb structure 31. Each clamp 11g, 11h comes into contact with the ceramic honeycomb structure with a semi-circular surface complementary to the outer peripheral surface of the ceramic honeycomb structure, to prevent a clamping force from being locally applied to the outer peripheral surface of the ceramic honeycomb structure. Each clamp 11g, 11h can be provided with masking members 11e, 11f, with which the ceramic honeycomb structure is gripped by the clamps 11g, 11h. The metal-made masking member 11e is fixed to the upper clamp 11g, and the metal-made masking member 11f is fixed to the lower clamp 11h, both having a semi-circular shape complementary to the outer peripheral surface of the ceramic honeycomb structure. The masking members 11e, 11f cover 80% of the outer peripheral surface of the ceramic honeycomb structure. Though not depicted, the masking members 11e, 11f are provided with sponge in portions coming into contact with the outer peripheral surface of the ceramic honeycomb structure.

The orifice 12 in the form of a slit is provided at one end of a box 12a, with a gap A between the orifice 12 and the end surface 32a adjustable in a range of 5-100 mm.

The gap A between the orifice 12 and the end surface 32a can be set by an orifice-moving means 14 described later with high precision in two steps; 50-100 mm in the first step as shown in FIG. 2(d), and 5-50 mm in the second step. The gap (A1, A2) between the orifice 12 and the end surface 32a is set not only in two steps, but also in three or more steps, if necessary.

As shown in FIG. 1(c), the orifice 12 may have a slit width Wx of 0.5-5 times the cell pitch p of the ceramic honeycomb structure 31, and a slit length Wy of 0.2-0.5 times the outer diameter D of the end surface 32a (32b).

In a gas source 13 connected to the orifice 12, an air compressor generates compressed air having pressure P of 0.2-0.5 MPa, and supplies it to the box 12a through a pipe. The pipe connected to the box 12a is provided with a mist separator (not shown) for adjusting the dew point of the gas to 4° C. or lower.

As shown in FIGS. 1(a) and 1(b), the orifice-moving means 14 disposed on the base 14a of the apparatus 10 comprises a servo actuator 14z for moving the orifice 12 relative to the end surface 32a in a Z-axis direction, a rack-and-pinion motor 14y projecting upward from the servo actuator 14z for moving the orifice 12 relative to the end surface 32a in a Y-axis direction, and a servo actuator 14x mounted to an upper end of a rack in the rack-and-pinion motor 14y for moving the orifice 12 relative to the end surface 32a in an X-axis direction. The servo actuator 14x has position-repeating precision within ±0.05 mm, thereby determining the gap A between the orifice 12 and the end surface 32a (32b) with high precision.

The dust-collecting means 15 comprises a hood 15a covering the end surface 32b on the opposite side of the orifice 12, and a gas-discharging blower (not shown) connected to the hood 15a. The hood 15a comprises a pneumatic cylinder 15b for advancing the hood 15a in the cleaning step, and retreating the hood 15a when the ceramic honeycomb structure 31 is attached or detached.

The end surface 32a of the ceramic honeycomb structure 31 is cleaned by the apparatus 10 shown in FIGS. 1(a) to 1(c) in the following manner.

(1) Attaching and Detaching Ceramic Honeycomb Structure 31 to Fixing Means 11

In a state where the fixing means 11 retreats to the original position where the upper clamp 11g fixed to the masking member 11e is elevated, the ceramic honeycomb structure 31 is attached or detached. A start button is pushed to automatically conduct cleaning by the following steps (2)-(4).

(2) Advancement of Fixing Means 11 to Cleaning Position

After the fixing means 11 advances and stops at the cleaning position, the hold 15a of the dust-collecting means 15 moves leftward in FIGS. 1(a) and 1(b) to cover the end surface 32b of the ceramic honeycomb structure 31, and the gas-discharging blower (not shown) is then operated.

(3) Cleaning of End Surface Portion of Ceramic Honeycomb Structure 11

Figure 2A:
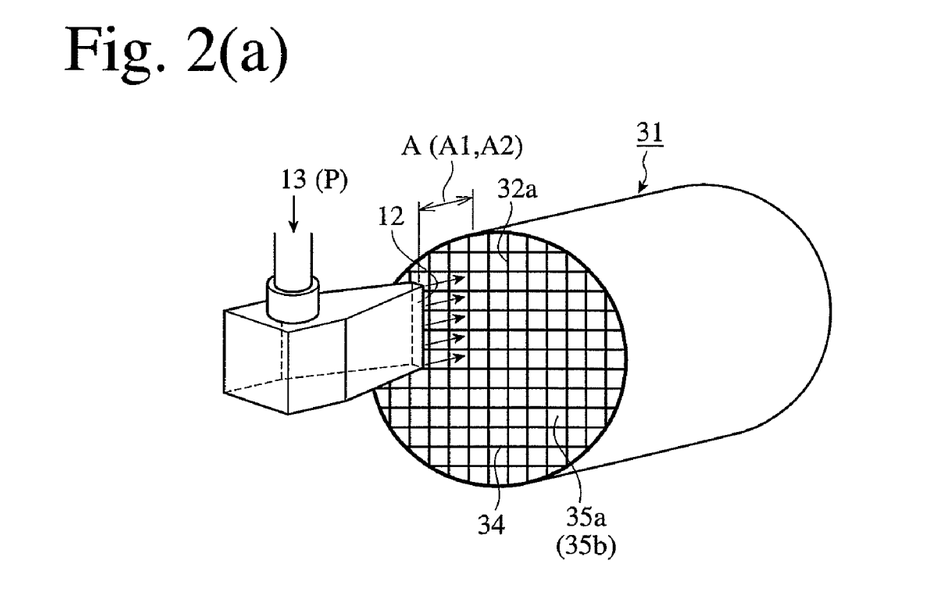
FIG. 2(a) is a perspective view showing the relation between a slit orifice and a ceramic honeycomb structure.
Figure 2B:
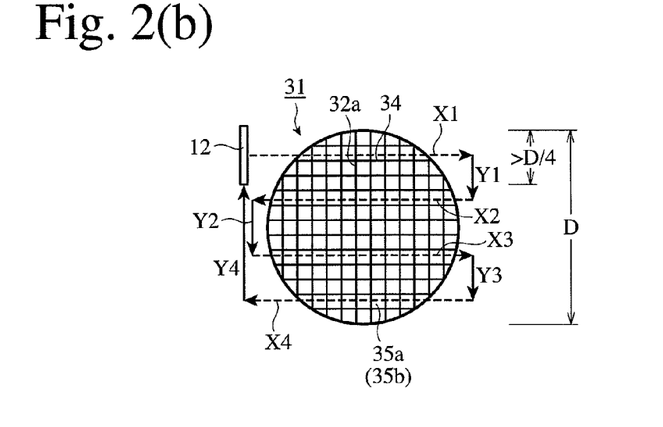
FIG. 2(b) is a front view showing one example of the moving loci of a slit orifice.
Figure 2C:
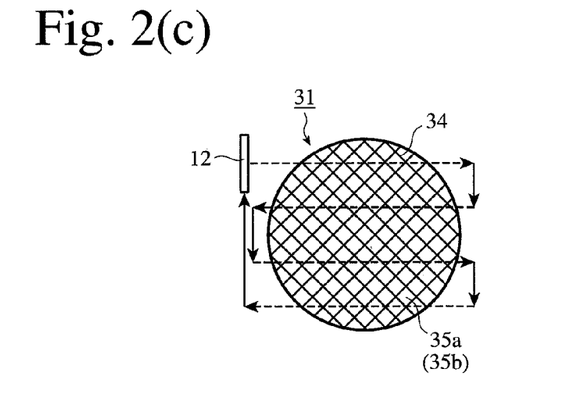
FIG. 2(c) is a front view showing another example of the moving loci of a slit orifice.

While moving the orifice 12 relative to one end surface 32a of the ceramic honeycomb structure 31 in X-axis, Y-axis, and Z-axis directions, a gas is ejected to clean the end surface 32a. Operating the servo actuator 14z shown in FIG. 1, the orifice 12 is moved such that a gap A1 between the orifice 12 and the end surface 32a is 50-100 mm in the first step shown in FIG. 2(d). The orifice 12 moves to a first one of plural regions (four regions in FIG. 2) obtained by dividing the diameter D of the ceramic honeycomb structure in a Y-axis direction. The number of division of the diameter D of the ceramic honeycomb structure in a Y-axis direction is determined depending on the length Wy of the orifice 12. Compressed air at pressure P1 is then ejected from the orifice 12. The servo actuator 14x shown in FIG. 1 is simultaneously operated to move the orifice 12 in the first region in an X1 direction as shown in FIG. 2(b), thereby blowing off dust and cut pieces. Dust and cut pieces pass through the cells, exit from the end surface on the opposite side, and collected by the dust-collecting means 15. The rack-and-pinion motor 14y shown in FIG. 1 is then operated to rapidly move the orifice 12 to a second region in a Y1 direction. Thereafter, the servo actuator 14x shown in FIG. 1 is operated again to move the orifice 12 in an X2 direction. Similarly, the orifice 12 is moved in the order of X2→Y2 (third region)→X3→Y3 (fourth region)→X4→Y4, thereby roughly cleaning all of the end surface 32a and the cells 35a, 35b. The rotary actuator 11c is operated to turn the ceramic honeycomb structure 31 oppositely, and the same cleaning operation is conducted on the other end surface 32b.

(4) Finish Cleaning of End Surface Portions of Ceramic Honeycomb Structure 11

Figure 2D:
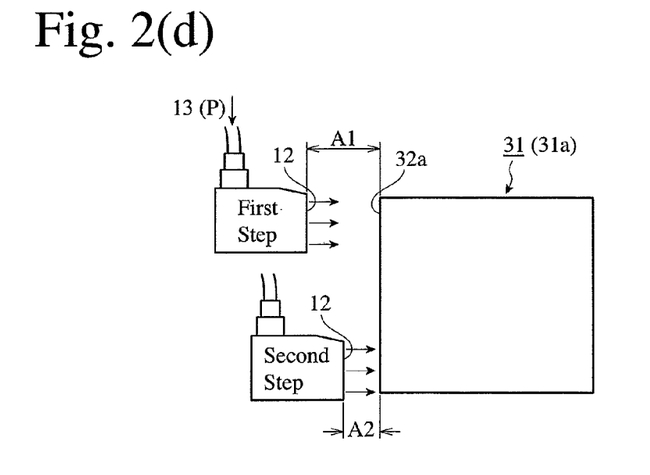
FIG. 2(d) is a side view showing the relation between a slit orifice and a ceramic honeycomb structure.

After the orifice 12 is moved such that a gap A2 between the orifice 12 and the end surface 32a is 5-50 mm in the second step shown in FIG. 2(d), compressed air at pressure P1 is ejected from the orifice 12. By moving the orifice 12 in the order of X1→Y1→X2→Y2→Y3→Y4 as shown in FIG. 2(b), all of the end surface 32a and the cells 35a (35b) including cells near the peripheral wall 31a are finish-cleaned without leaving dust and cut pieces. The rotary actuator 11c is then operated to turn the ceramic honeycomb structure 31, and the same cleaning operation is conducted on the other end surface 32b.

Example 1

Kaolin powder, talc powder, silica powder, alumina powder, etc. were formulated to obtain a cordierite-forming material powder comprising 48-52% of $SiO_2$, 33-37% of $Al_2O_3$, and 12-15% of MgO by mass, to which a binder such as methylcellulose, hydroxypropylmethylcellulose, etc., a lubricant, and graphite as a pore-forming material were added. The resultant mixture was fully dry-blended, and then blended with water to obtain a plasticized moldable ceramic material. This moldable material was extrusion-molded to obtain a honeycomb-shaped, molded body. This molded body is turned to cordierite by sintering, providing a ceramic honeycomb structure having an outer diameter of 260 mm, a cell wall thickness of 0.3 mm, a porosity of 65%, an average pore diameter of 20 µm, and a cell pitch of 1.5 mm. This molded body was dried, machined by a diamond cutter to obtain a dried ceramic honeycomb structure having length L of 320 mm between end surfaces 32a and 32b. After machining, a lot of dust and cut pieces were attached to the end surfaces 32a, 32b and cells 35a, 35b.

Using an apparatus 10 for cleaning the end surface portions of a ceramic honeycomb structure, which is shown in FIG. 1, the dried ceramic honeycomb structure 31 is cleaned to remove dust and cut pieces from the end surfaces and the cells. The orifice 12 in the apparatus 10 was changed to a circular one having a diameter of 6 mm, and the gap A between the orifice 12 and the end surface 32a, 32b was set as shown in Table 1. Compressed air having a dew point of 4° C. was ejected at 0.5 MPa from the orifice 12 onto one end surface 32a of the dried ceramic honeycomb structure 31, while collecting dust by a dust-collecting means 15 disposed at the opposite end surface, to conduct cleaning. The orifice 12 was first moved for cleaning relative to the end surface in an X-axis direction in the first region among seven regions obtained by dividing the diameter D of the end surface in a Y-axis direction, and the orifice was then moved for cleaning in the second to seventh regions in the same manner as above. The dried ceramic honeycomb structure 31 was turned oppositely to clean the other end surface 32b in the same manner. A ratio Q2/Q1 of the flow rate Q2 (m3/s) of a gas sucked by the hood to the flow rate Q1 (m3/s) of a gas ejected from the orifice was 1.0.

After cleaning, [I] dust and cut pieces on the end surfaces 32a, 32b and in the cells 35a, 35b, and [II] the damage of the end surfaces 32a, 32b were evaluated. With respect to the dust and cut pieces in [I], the number of cells in which dust remained was counted by a light transmission inspection method, and evaluated by the following standard.

Excellent: The number of cells in which dust remained was 0.05% or less of all cells.
Good: The number of cells in which dust remained was more than 0.05% and 0.1% or less of all cells.
Fair: The number of cells in which dust remained was more than 0.1% and 0.15% or less of all cells.
Poor: The number of cells in which dust remained was more than 0.15% of all cells.

The damage of end surfaces in [II] was evaluated by the following standard.

Excellent: Cell walls had no cracking and damage.
Good: Cell walls had fine cracking and damage, which did not cause any problems in practical use.
Fair: Cell walls had cracking and damage, which did not cause any problems in practical use.
Poor: Cell walls had cracking and damage, which made the ceramic honeycomb structure unusable.

The results are shown in Table 2.

Example 2

The production and cleaning of a ceramic honeycomb structure were conducted in the same manner as in Example 1, except for machining the dried ceramic honeycomb structure by a grinder having a particle size of #200 instead of machining it by a diamond cutter, and evaluated in the same manner as in Example 1. The results are shown in Table 2.

Example 3

The production and cleaning of a ceramic honeycomb structure were conducted in the same manner as in Example 2, except for machining by a grinder having a particle size of #400 in place of a grinder having a particle size of #200, and changing the ratio Q2/Q1 of a gas flow rate at the hood to a gas flow rate at the orifice as shown in Table 1, and evaluated in the same manner as in Example 1. The results are shown in Table 2.

Examples 4 and 5

The production and cleaning of ceramic honeycomb structures were conducted in the same manner as in Example 3, except for changing the diameter of the orifice 12 and the gap A between the orifice 12 and the end surface 32a, 32b as shown in Table 1, and evaluated in the same manner as in Example 1. The results are shown in Table 2.

Example 6

The production and cleaning of a ceramic honeycomb structure were conducted in the same manner as in Example 1, except for changing the orifice 12 to a slit-like shape having a slit width Wx of 0.7 mm and a slit length Wy of 40 mm, and changing the gap A between the orifice 12 and the end surface 32a, 32b to 15 mm (5% of the length of the molded body), and evaluated in the same manner as in Example 1. The results are shown in Table 2.

Example 7

The production and cleaning of a ceramic honeycomb structure were conducted in the same manner as in Example 6, except for machining the dried ceramic honeycomb structure by a grinder having a particle size of #200 instead of machining it by a diamond cutter, and changing the ratio Q2/Q1 of a gas flow rate at the hood to a gas flow rate at the orifice as shown in Table 1, and evaluated in the same manner as in Example 1. The results are shown in Table 2.

Examples 8-11

The production and cleaning of ceramic honeycomb structures were conducted in the same manner as in Example 6, except for machining by a grinder having a particle size of #400 in place of a grinder having a particle size of #200, and changing the gap A between the orifice 12 and the end surface 32a, 32b, the pressure of compressed air ejected from the orifice 12, and the ratio Q2/Q1 of a gas flow rate at the hood to a gas flow rate at the orifice as shown in Table 1, and evaluated in the same manner as in Example 1. The results are shown in Table 2.

Example 12

The production and cleaning of a ceramic honeycomb structure were conducted in the same manner as in Example 11, except for changing the orifice 12 to a slit-like shape having a slit width Wx of 3.0 mm and a slit length Wy of 80 mm, changing the pressure of compressed air ejected from the orifice 12 as shown in Table 1, and quartering the diameter D of the end surface in a Y-axis direction for cleaning, and evaluated in the same manner as in Example 1. The results are shown in Table 2.

Example 13

The production and cleaning of a ceramic honeycomb structure were conducted in the same manner as in Example 12, except for changing the gap A1 between the orifice 12 and the end surface 32a, 32b to 45 mm in the first cleaning step, and changing the gap A2 to 5 mm in the second cleaning step, and evaluated in the same manner as in Example 1. The results are shown in Table 2.

Example 14

The production and cleaning of a ceramic honeycomb structure were conducted in the same manner as in Example 12, except for changing the gap A1 between the orifice 12 and the end surface 32a, 32b and the pressure of compressed air ejected from the orifice 12 as shown in Table 1, and evaluated in the same manner as in Example 1. The results are shown in Table 2.

Examples 15-17

The production and cleaning of ceramic honeycomb structures were conducted in the same manner as in Example 13, except for changing gaps A1, A2 between the orifice 12 and the end surface 32a, 32b in the first and second cleaning steps, and the pressure of compressed air ejected from the orifice 12 as shown in Table 1, and evaluated in the same manner as in Example 1. The results are shown in Table 2.

Example 18

A honeycomb body molded in the same manner as in Example 1 was dried, sintered at 1420° C. to form cordierite, thereby obtaining a ceramic honeycomb structure having an outer diameter of 260 mm, a cell wall thickness of 0.3 mm, a porosity of 65%, an average pore diameter of 20 μm and a cell pitch of 1.5 mm. The sintered ceramic honeycomb structure was machined by a grinder having a particle size of #200 such that the length L between the end surface 32a and the end surface 32b was 320 mm. A lot of dust and cut pieces were attached to the machined end surfaces 32a, 32b and the cells 35a, 35b.

The ceramic honeycomb structure was cleaned in the same manner as in Example 7 except for changing the pressure of compressed air ejected from the orifice 12 to 0.3 MPa, and evaluated in the same manner as in Example 1. The results are shown in Table 2.

Example 19

The production and cleaning of a sintered ceramic honeycomb structure were conducted in the same manner as in Example 18, except for machining the ceramic honeycomb structure by a grinder having a particle size of #400, and evaluated in the same manner as in Example 1. The results are shown in Table 2.

Example 20

The production and cleaning of a sintered ceramic honeycomb structure were conducted in the same manner as in Example 18, except for machining the ceramic honeycomb structure by a grinder having a particle size of #600, and evaluated in the same manner as in Example 1. The results are shown in Table 2.

Example 21

The production and cleaning of a sintered ceramic honeycomb structure were conducted in the same manner as in Example 19, except for providing the gripping clamps with metal-made masking members with sponge liners covering 80% of the outer peripheral surface 36 of the ceramic honeycomb structure, and evaluated in the same manner as in Example 1. The results are shown in Table 2.

Example 22

The production and cleaning of a sintered ceramic honeycomb structure were conducted in the same manner as in Example 20, except for changing the gap A between the orifice 12 and the end surface 32a, 32b as shown in Table 1, and evaluated in the same manner as in Example 1. The results are shown in Table 2.

Example 23

The production and cleaning of a sintered ceramic honeycomb structure were conducted in the same manner as in Example 22, except for changing the orifice 12 to a slit-like shape having a slit width Wx of 3.0 mm and a slit length Wy of 80 mm, changing the pressure of compressed air ejected from the orifice 12 as shown in Table 1, and quartering the diameter D of the end surface in a Y-axis direction for cleaning, and evaluated in the same manner as in Example 1. The results are shown in Table 2.

Example 24

The production and cleaning of a sintered ceramic honeycomb structure were conducted in the same manner as in Example 23, except for changing the gap A1 between the orifice 12 and the end surface 32a, 32b to 45 mm in the first cleaning step, and a gap A2 to 5 mm in the second cleaning step, and evaluated in the same manner as in Example 1. The results are shown in Table 2.

Example 25

The production and cleaning of a sintered ceramic honeycomb structure were conducted in the same manner as in Example 24, except for providing the gripping clamps with metal-made masking members with sponge liners covering 80% of the outer peripheral surface 36 of the ceramic honeycomb structure, and changing the pressure of compressed air ejected from the orifice 12 as shown in Table 1, and evaluated in the same manner as in Example 1. The results are shown in Table 2.

Example 26

The production and cleaning of a sintered ceramic honeycomb structure were conducted in the same manner as in Example 23, except for changing the gap A1 between the orifice 12 and the end surface 32a, 32b and the pressure of compressed air ejected from the orifice 12 as shown in Table 1, and evaluated in the same manner as in Example 1. The results are shown in Table 2.

Example 27

The production and cleaning of a sintered ceramic honeycomb structure were conducted in the same manner as in Example 24, except for changing the gap A1 between the orifice 12 and the end surface 32a, 32b and the pressure of compressed air ejected from the orifice 12 as shown in Table 1, and evaluated in the same manner as in Example 1. The results are shown in Table 2.

Example 28

The production and cleaning of a sintered ceramic honeycomb structure were conducted in the same manner as in Example 27, except for providing the gripping clamps with metal-made masking members with sponge liners covering 80% of the outer peripheral surface 36 of the ceramic honeycomb structure, and changing the pressure of compressed air ejected from the orifice 12 as shown in Table 1, and evaluated in the same manner as in Example 1. The results are shown in Table 2.

Example 29

The production and cleaning of a sintered ceramic honeycomb structure were conducted in the same manner as in Example 26, except for providing the gripping clamps with metal-made masking members with sponge liners covering 80% of the outer peripheral surface 36 of the ceramic honeycomb structure, and changing the pressure of compressed air ejected from the orifice 12 as shown in Table 1, and evaluated in the same manner as in Example 1. The results are shown in Table 2.

Example 30

The production and cleaning of a sintered ceramic honeycomb structure were conducted in the same manner as in Example 28, except for changing the pressure of compressed air ejected from the orifice 12 as shown in Table 1, and evaluated in the same manner as in Example 1. The results are shown in Table 2.

Example 31

A honeycomb body molded in the same manner as in Example 1 was dried, machined to remove the peripheral wall and nearby cell walls, sintered at 1420° C. to form cordierite, thereby obtaining a ceramic honeycomb structure 31 having an outer diameter of 250 mm, a cell wall thickness of 0.3 mm, a porosity of 65%, an average pore diameter of 20 μm and a cell pitch of 1.5 mm, and having grooves extending substantially longitudinally on the periphery. This ceramic honeycomb structure 31 was machining by a grinder having a particle size of #200 such that the length L between the end surface 32a and the end surface 32b was 320 mm. A lot of dust and cut pieces were attached to the machined end surfaces 32a, 32b and the cells 35a, 35b.

The machined ceramic honeycomb structure 31 was cleaned in the same manner as in Example 18, and evaluated in the same manner as in Example 1. The results are shown in Table 2.

Example 32

The production and cleaning of a machined ceramic honeycomb structure were conducted in the same manner as in Example 31, except for providing the gripping clamps with metal-made masking members with sponge liners covering 80% of the outer peripheral surface 36 of the ceramic honeycomb structure, and evaluated in the same manner as in Example 1. The results are shown in Table 2.

Example 33

The production and cleaning of a machined ceramic honeycomb structure were conducted in the same manner as in Example 32, except for changing the gap A between the orifice 12 and the end surface 32a, 32b as shown in Table 1, and evaluated in the same manner as in Example 1. The results are shown in Table 2.

Example 34

The production and cleaning of a machined ceramic honeycomb structure were conducted in the same manner as in Example 33, except for changing the orifice 12 to a slit-like shape having a slit width Wx of 3.0 mm and a slit length Wy of 80 mm, changing the pressure of compressed air ejected from the orifice 12 as shown in Table 1, and quartering the diameter D of the end surface in a Y-axis direction for cleaning, and evaluated in the same manner as in Example 1. The results are shown in Table 2.

Example 35

The production and cleaning of a machined ceramic honeycomb structure were conducted in the same manner as in Example 34, except for changing the gap A1 between the orifice 12 and the end surface 32a, 32b to 45 mm in the first cleaning step, and the gap A2 to 5 mm in the second cleaning step, and evaluated in the same manner as in Example 1. The results are shown in Table 2.

Examples 36-42

The production and cleaning of machined ceramic honeycomb structures were conducted in the same manner as in Example 35, except for providing the gripping clamps with metal-made masking members with sponge liners covering 80% of the outer peripheral surface 36 of the ceramic honeycomb structure, and changing the gaps A1, A2 and the pressure P1, P2 of compressed air ejected from the orifice 12 as shown in Table 1, and evaluated in the same manner as in Example 1. The results are shown in Table 2.

Example 43

The production and cleaning of a machined ceramic honeycomb structure were conducted in the same manner as in Example 32, except for changing the orifice 12 to a slit-like shape having a slit width Wx of 8.0 mm and a slit length Wy of 140 mm, and changing the gap A between the orifice 12 and the end surface 32a, 32b, and the pressure of compressed air ejected from the orifice 12 as shown in Table 1, and halving the diameter D of the end surface in a Y-axis direction for cleaning, and evaluated in the same manner as in Example 1. The results are shown in Table 2.

Example 44

The production and cleaning of a machined ceramic honeycomb structure were conducted in the same manner as in Example 36, except for changing the orifice 12 to a slit-like shape having a slit width Wx of 1.0 mm and a slit length Wy of 70 mm, and changing the gaps A1, A2 and the pressure P1, P2 of compressed air ejected from the orifice 12 as shown in Table 1, and evaluated in the same manner as in Example 1. The results are shown in Table 2.

Example 45

The production and cleaning of a machined ceramic honeycomb structure were conducted in the same manner as in Example 44, except for changing the orifice 12 to a slit-like shape having a slit width Wx of 5.0 mm and a slit length Wy of 110 mm, and evaluated in the same manner as in Example 1. The results are shown in Table 2.

Comparative Example 1

The production and cleaning of a machined ceramic honeycomb structure were conducted in the same manner as in Example 31, except for changing the orifice 12 to a slit-like shape having a slit width Wx of 0.7 mm and a slit length Wy of 40 mm, providing the orifice with a resin-made brush having a length of 20 mm and a diameter of 0.5 mm, and changing the ratio Q2/Q1 of a gas flow rate at the hood to a gas flow rate at the orifice as shown in Table 1, and evaluated in the same manner as in Example 1. The results are shown in Table 2.

Comparative Example 2

The production and cleaning of a machined ceramic honeycomb structure were conducted in the same manner as in Comparative Example 1, except for using a spray nozzle 53a provided with a brush 52a, and a narrow dust-collecting hopper 54a as shown in FIG. 5(a), which is described in JP 8-117713 A. The spray nozzle 53a provided with a brush 52a was disposed in opposition to the end surface 32a of the ceramic honeycomb structure 31, and comprised a mechanism enabling vertical movement in parallel with the end surface 32a. The brush 52a was made of a resin and had a length of 30 mm and a diameter of 0.1 mm, and the spray nozzle 53a had a width of 10 mm and a length of 260 mm. The spray nozzle 53a provided with the brush 52a was used in place of the orifice 12 in the present invention, and the narrow dust-collecting hopper 54a was disposed on the opposite side of the end surface 32a in place of the dust-collecting means 15 in the present invention. Moving the spray nozzle 53a provided with the brush 52a up and down to detach dust and cut pieces from the end surface 32a by the brush 52a, air was ejected from the spray nozzle 53a for cleaning. After cleaning, the same evaluation as in Example 1 was conducted. The results are shown in Table 2.

Comparative Example 3

The machined ceramic honeycomb structure obtained in the same manner as in Example 31 was cleaned by the method described in JP 2000-43024 A [FIG. 5(b)], in which air was ejected from a blower having an outer diameter of 260 mm onto the end surface 32b of the honeycomb structure 31, and the end surface 32a was brushed with a resin-made brush 52b having hair of 20 mm in length and 0.5 mm in diameter. After cleaning, the same evaluation as in Example 1 was conducted. The results are shown in Table 2.

TABLE 1

| No. | Orifice Shape | Width mm | Times[1] | Y (mm) | A1[2] (mm) | P1[3] (MPa) | A2[2] (mm) | P2[3] (MPa) |
|---|---|---|---|---|---|---|---|---|
| Example 1 | Circle | φ6* | — | — | 5 | 0.4 | — | — |
| Example 2 | Circle | φ6* | — | — | 5 | 0.4 | — | — |
| Example 3 | Circle | φ6* | — | — | 5 | 0.4 | — | — |
| Example 4 | Circle | φ18* | — | — | 5 | 0.4 | — | — |
| Example 5 | Circle | φ26* | — | — | 100 | 0.4 | — | — |
| Example 6 | Slit | 0.7 | 0.47 | 40 | 15 | 0.5 | — | — |
| Example 7 | Slit | 0.7 | 0.47 | 40 | 15 | 0.5 | — | — |
| Example 8 | Slit | 0.7 | 0.47 | 40 | 15 | 0.5 | — | — |
| Example 9 | Slit | 0.7 | 0.47 | 40 | 15 | 0.5 | — | — |
| Example 10 | Slit | 0.7 | 0.47 | 40 | 15 | 0.6 | — | — |
| Example 11 | Slit | 0.7 | 0.47 | 40 | 45 | 0.5 | — | — |
| Example 12 | Slit | 3.0 | 2.0 | 80 | 45 | 0.2 | — | — |
| Example 13 | Slit | 3.0 | 2.0 | 80 | 45 | 0.2 | 5 | 0.2 |
| Example 14 | Slit | 3.0 | 2.0 | 80 | 75 | 0.1 | — | — |
| Example 15 | Slit | 3.0 | 2.0 | 80 | 75 | 0.1 | 15 | 0.1 |
| Example 16 | Slit | 3.0 | 2.0 | 80 | 75 | 0.1 | 15 | 0.3 |
| Example 17 | Slit | 3.0 | 2.0 | 80 | 75 | 0.3 | 15 | 0.3 |
| Example 18 | Slit | 0.7 | 0.47 | 40 | 15 | 0.3 | — | — |
| Example 19 | Slit | 0.7 | 0.47 | 40 | 15 | 0.3 | — | — |
| Example 20 | Slit | 0.7 | 0.47 | 40 | 15 | 0.3 | — | — |
| Example 21 | Slit | 0.7 | 0.47 | 40 | 15 | 0.3 | — | — |
| Example 22 | Slit | 0.7 | 0.47 | 40 | 45 | 0.3 | — | — |
| Example 23 | Slit | 3.0 | 2.0 | 80 | 45 | 0.5 | — | — |
| Example 24 | Slit | 3.0 | 2.0 | 80 | 45 | 0.5 | 5 | 0.5 |
| Example 25 | Slit | 3.0 | 2.0 | 80 | 45 | 0.3 | 5 | 0.3 |
| Example 26 | Slit | 3.0 | 2.0 | 80 | 75 | 0.4 | — | — |
| Example 27 | Slit | 3.0 | 2.0 | 80 | 75 | 0.4 | 15 | 0.4 |
| Example 28 | Slit | 3.0 | 2.0 | 80 | 75 | 0.3 | 15 | 0.3 |
| Example 29 | Slit | 3.0 | 2.0 | 80 | 75 | 0.1 | — | — |
| Example 30 | Slit | 3.0 | 2.0 | 80 | 75 | 0.1 | 15 | 0.3 |
| Example 31 | Slit | 0.7 | 0.47 | 40 | 15 | 0.3 | — | — |
| Example 32 | Slit | 0.7 | 0.47 | 40 | 15 | 0.3 | — | — |
| Example 33 | Slit | 0.7 | 0.47 | 40 | 45 | 0.3 | — | — |
| Example 34 | Slit | 3.0 | 2.0 | 80 | 45 | 0.5 | — | — |
| Example 35 | Slit | 3.0 | 2.0 | 80 | 45 | 0.5 | 5 | 0.5 |
| Example 36 | Slit | 3.0 | 2.0 | 80 | 45 | 0.5 | 5 | 0.5 |
| Example 37 | Slit | 3.0 | 2.0 | 80 | 50 | 0.4 | 5 | 0.4 |
| Example 38 | Slit | 3.0 | 2.0 | 80 | 75 | 0.4 | 15 | 0.4 |
| Example 39 | Slit | 3.0 | 2.0 | 80 | 85 | 0.3 | 30 | 0.3 |

TABLE 1-continued

| | | | | | | | | |
|---|---|---|---|---|---|---|---|---|
| Example 40 | Slit | 3.0 | 2.0 | 80 | 100 | 0.3 | 50 | 0.3 |
| Example 41 | Slit | 3.0 | 2.0 | 80 | 110 | 0.2 | 55 | 0.2 |
| Example 42 | slit | 3.0 | 2.0 | 80 | 110 | 0.2 | 55 | 0.4 |
| Example 43 | Slit | 8.0 | 5.3 | 140 | 120 | 0.3 | — | — |
| Example 44 | Slit | 1.0 | 0.67 | 70 | 75 | 0.3 | 15 | 0.3 |
| Example 45 | Slit | 5.0 | 3.3 | 110 | 75 | 0.3 | 15 | 0.3 |
| Comparative Example 1 | Slit with Brush | 0.7 | 0.47 | 40 | 15 | 0.3 | — | — |
| Comparative Example 2 | Nozzle with Brush | 10 | 6.7 | 260 | 20 | 0.3 | — | — |
| Comparative Example 3 | Blower + Brush | φ260* | — | — | 50 | 0.3 | — | — |

| No. | Q2/Q1 | Water Content (%) | Maximum Diameter of Dust (mm) | Masking of Peripheral Surface | [I] Attached Dust | [II] Damage of End Surface |
|---|---|---|---|---|---|---|
| Example 1 | 1.0 | 1.0 | 3 | No | Fair | Excellent |
| Example 2 | 1.0 | 1.0 | 2 | No | Good | Excellent |
| Example 3 | 1.2 | 1.0 | 1 | No | Fair | Excellent |
| Example 4 | 1.2 | 1.0 | 1 | No | Fair | Excellent |
| Example 5 | 1.2 | 1.0 | 1 | No | Fair | Excellent |
| Example 6 | 1.0 | 1.0 | 3 | No | Fair | Good |
| Example 7 | 1.2 | 1.0 | 2 | No | Good | Good |
| Example 8 | 1.2 | 1.0 | 1 | No | Fair | Good |
| Example 9 | 1.4 | 1.0 | 1 | No | Good | Good |
| Example 10 | 1.2 | 1.0 | 1 | No | Fair | Fair |
| Example 11 | 1.2 | 1.0 | 1 | No | Good | Good |
| Example 12 | 1.2 | 1.0 | 1 | No | Fair | Excellent |
| Example 13 | 1.2 | 1.0 | 1 | No | Good | Excellent |
| Example 14 | 1.2 | 1.0 | 1 | No | Fair | Excellent |
| Example 15 | 1.2 | 1.0 | 1 | No | Good | Excellent |
| Example 16 | 1.2 | 1.0 | 1 | No | Excellent | Excellent |
| Example 17 | 1.2 | 1.0 | 1 | No | Excellent | Excellent |
| Example 18 | 1.2 | — | 2 | No | Good | Excellent |
| Example 19 | 1.2 | — | 1 | No | Good | Excellent |
| Example 20 | 1.2 | — | 0.05 | No | Fair | Excellent |
| Example 21 | 1.2 | — | 1 | Yes | Good | Excellent |
| Example 22 | 1.2 | — | 0.05 | No | Good | Excellent |
| Example 23 | 1.2 | — | 1 | No | Fair | Good |
| Example 24 | 1.2 | — | 1 | No | Good | Good |
| Example 25 | 1.2 | — | 1 | Yes | Excellent | Excellent |
| Example 26 | 1.2 | — | 1 | No | Good | Excellent |
| Example 27 | 1.2 | — | 1 | No | Excellent | Excellent |
| Example 28 | 1.2 | — | 1 | Yes | Excellent | Excellent |
| Example 29 | 1.2 | — | 1 | Yes | Good | Excellent |
| Example 30 | 1.2 | — | 1 | Yes | Excellent | Excellent |
| Example 31 | 1.2 | — | 1 | No | Fair | Excellent |
| Example 32 | 1.2 | — | 1 | Yes | Good | Excellent |
| Example 33 | 1.2 | — | 1 | No | Good | Excellent |
| Example 34 | 1.2 | — | 1 | No | Fair | Good |
| Example 35 | 1.2 | — | 1 | No | Fair | Good |
| Example 36 | 1.2 | — | 1 | Yes | Good | Good |
| Example 37 | 1.2 | — | 1 | Yes | Excellent | Excellent |
| Example 38 | 1.2 | — | 1 | Yes | Excellent | Excellent |
| Example 39 | 1.2 | — | 1 | Yes | Excellent | Excellent |
| Example 40 | 1.2 | — | 1 | Yes | Excellent | Excellent |
| Example 41 | 1.2 | — | 1 | Yes | Good | Excellent |
| Example 42 | 1.2 | — | 1 | Yes | Excellent | Excellent |
| Example 43 | 1.2 | — | 1 | Yes | Fair | Excellent |
| Example 44 | 1.2 | — | 1 | Yes | Excellent | Excellent |
| Example 45 | 1.2 | — | 1 | Yes | Good | Excellent |
| Comparative Example 1 | 1.0 | — | 1 | No | Good | Poor |
| Comparative Example 2 | 1.0 | — | 1 | No | Fair | Poor |
| Comparative Example 3 | 1.0 | — | 1 | No | Fair | Poor |

Note:
*The diameter of the orifice.
(1)The magnification (times) of the slit width per the cell pitch.
(2)Gap.
(3)Pressure.

It is clear from Table 1 that dust and cut pieces were removed from the end surfaces and the cells without damaging the end surfaces of the ceramic honeycomb structure, in Examples 1-45 within the present invention. Among them, in Examples 12, 13, 20, 21, 26-29, dust and cut pieces were effectively removed even from cells near the peripheral wall without damaging the end surface 32a, because the gap A between the orifice 12 and the end surface 32a was set in two steps; the gap A1 was 50-100 mm in the first step, and the gap A2 was 5-50 mm in the second step. On the other hand, in Comparative Examples 1-3, the end surfaces were damaged by a brush attached to the orifice.

EFFECTS OF THE INVENTION

The production method and apparatus of the present invention can effectively remove dust and cut pieces from cells without damaging the end surfaces of the dried or sintered ceramic honeycomb structure, thereby producing a highly reliable ceramic honeycomb filter with dramatically improved efficiency.

What is claimed is:

1. A method for producing a ceramic honeycomb structure comprising the steps of machining end surfaces of an unsintered or sintered ceramic honeycomb structure, and ejecting a gas from a slit-like orifice moving in X-axis, Y-axis and Z-axis directions relative to an opposing end surface without contact, thereby removing dust and/or cut pieces from an end surface portion without using a brush, wherein a gap A between said orifice and said end surface is 1-35% of the length L of said ceramic honeycomb structure.

2. The method for producing a ceramic honeycomb structure according to claim 1, wherein said slit-like orifice has a slit width of 0.5-5 times the cell pitch of said ceramic honeycomb structure.

3. The method for producing a ceramic honeycomb structure according to claim 1, wherein said gap A between said orifice and said end surface is 5-100 mM.

4. The method for producing a ceramic honeycomb structure according to claim 1, wherein compressed air at pressure P of 0.2-0.5 MPa is ejected from said orifice for cleaning.

5. The method for producing a ceramic honeycomb structure according to claim 1, wherein said gap A between said orifice and said end surface is changed to conduct said cleaning step 2 or more times.

6. The method for producing a ceramic honeycomb structure according to claim 5, wherein said gap A is gradually reduced to repeat said cleaning step.

7. The method for producing a ceramic honeycomb structure according to claim 5, wherein said cleaning step is conducted 2 times.

8. The method for producing a ceramic honeycomb structure according to claim 7, wherein said gap A is 50-100 mm in the first cleaning step and 5-50 mm in the second cleaning step.

9. The method for producing a ceramic honeycomb structure according to claim 1, wherein to conduct cleaning, a gas is ejected onto one end surface of said ceramic honeycomb structure, and then onto the other end surface thereof.

10. The method for producing a ceramic honeycomb structure according to claim 1, wherein dust attached to end surface portions has the maximum diameter of 1.2 mm or less.

11. The method for producing a ceramic honeycomb structure according to claim 1, wherein cleaning is conducted while the gas is sucked by a hood opposing an end surface on the opposite side of said end surface under cleaning.

12. The method for producing a ceramic honeycomb structure according to claim 11, wherein the flow rate Q1 ($m^3$/s) of a gas ejected from said slit-like orifice and the flow rate Q2 ($m^3$/s) of a gas sucked by said hood meet the relation of Q1<Q2.

13. The method for producing a ceramic honeycomb structure according to claim 1, wherein after conducting said cleaning, dust remaining in the cells of said ceramic honeycomb structure is inspected.

14. The method for producing a ceramic honeycomb structure according to claim 1, wherein the amount of water in said unsintered ceramic honeycomb structure is 0.1-2%.

15. The method for producing a ceramic honeycomb structure according to claim 1, wherein masking members are disposed on an outer peripheral surface of said ceramic honeycomb structure.

16. The method for producing a ceramic honeycomb structure according to claim 1, wherein the gas ejected from said orifice has a dew point of 10° C. or lower.

17. The method for producing a ceramic honeycomb structure according claim 1, wherein said ceramic honeycomb structure is cleaned in a substantially horizontal state.

18. The method for producing a ceramic honeycomb structure according to claim 1, wherein said sintered ceramic honeycomb structure has a porosity of 50-80%.

* * * * *